United States Patent [19]

Verduijn et al.

[11] Patent Number: 5,783,321

[45] Date of Patent: Jul. 21, 1998

[54] ZSM-5 ZEOLITE

[75] Inventors: Johannes Petrus Verduijn, Leefdaal; Luc Roger Marc Martens, Meise; Johan Adriaan Martens, Huldenberg, all of Belgium

[73] Assignee: Exxon Chemical Patents Inc., Houston, Tex.

[21] Appl. No.: 351,351

[22] PCT Filed: Jun. 4, 1994

[86] PCT No.: PCT/EP93/01404

§ 371 Date: May 15, 1995

§ 102(e) Date: May 15, 1995

[87] PCT Pub. No.: WO93/25476

PCT Pub. Date: Dec. 23, 1993

[30] Foreign Application Priority Data

Jun. 5, 1992 [EP] European Pat. Off. ............. 92305182

[51] Int. Cl.[6] .......................... C01B 39/40; C01B 33/34
[52] U.S. Cl. .......................... 423/702; 423/704; 423/705; 423/708; 423/716; 423/709; 423/DIG. 22; 502/77
[58] Field of Search .............. 423/702, 704, 423/705, 708, 716, DIG. 22, 709; 502/77

[56] References Cited

U.S. PATENT DOCUMENTS

| | | | |
|---|---|---|---|
| 3,323,876 | 6/1967 | Arey et al. | 423/716 |
| 3,808,326 | 4/1974 | McDaniel et al. | 423/709 |
| 4,139,600 | 2/1979 | Rollmann et al. | 423/708 |
| 4,166,099 | 8/1979 | McDaniel et al. | 423/709 |
| 4,341,748 | 7/1982 | Plank et al. | |
| 4,797,267 | 1/1989 | Kuehl | 423/DIG. 22 |
| 5,100,852 | 3/1992 | Arntz et al. | 502/77 |
| 5,174,981 | 12/1992 | Hellring et al. | 423/705 |

FOREIGN PATENT DOCUMENTS

| | | |
|---|---|---|
| 0007098 | 1/1980 | European Pat. Off. . |
| 0093519 | 11/1983 | European Pat. Off. . |
| 0110650 | 6/1984 | European Pat. Off. . |
| 0 202 797 | 11/1986 | European Pat. Off. . |
| 3193-622 | 8/1991 | Japan . |
| 3193622 | 8/1991 | Japan . |

OTHER PUBLICATIONS

Araya et al. "A Partial Determination of the Stability Fields of Ferrierite and Zeolites ZSM-5, ZSM-48, & Nu-10 in Tu $K_2O -Al_2O_3-S_1O_2-NH_2[CH_2]_6NH_2$ System" *J. Chem. Research* 1985 192–193.

*Primary Examiner*—Mark L. Bell
*Assistant Examiner*—Louis M. Troilo
*Attorney, Agent, or Firm*—Edward F. Sherer

[57] ABSTRACT

Crystalline tectosilicate ZSM-5 zeolite may be prepared which comprise substantially needle-shaped agglomerates. Tectosilicate ZSM-5 zeolite having a $^{29}Si$ NMR spectrum having at least three peaks indicates the presence of Si atoms in the structure having 0, 1 or 2 T-atoms as nearest neighbors.

19 Claims, 9 Drawing Sheets

2,500 * SEM MICROGRAPHS
$SiO_2/Al_2O_3 = g2.6$ $SiO_2/Al_2O_3 = 40.0$ 2,500×

10,000×

40,000×

ZSM-5 ZEOLITE

ZSM-5 ZEOLITE

The present invention relates to a form of ZSM-5 zeolite, processes for its production, processes for its use in the production or conversion organic compounds, and processes for its use as a selective absorbent.

ZSM-5 is an MFI-type zeolite, usually an aluminosilicate zeolite, which has been found useful as a catalyst in a variety of processes for preparing, converting, separating or purifying organic compounds. The earliest ZSM-5 zeolites were prepared using an organic template in the synthesis mixture which directed the formation of the ZSM-5 structure. Known ZSM-5 zeolites prepared using an organic template generally have an $SiO_2/Al_2O_3$ molar ratio of at least 60 and frequently considerably greater than 60 (see e.g. U.S. Pat. No. 4,797,267). So-called "inorganic" ZSM-5 zeolites, made in the absence of an organic template, were prepared in the 1980's. Typically these have an $SiO_2/Al_2O_3$ molar ratio of from 20 to about 30 to 40. $SiO_2/Al_2O_3$ ratios of up to 80 have been reported (e.g. Zeolites 1989 Vol. 9 363–370).

The morphology of ZSM-5 crystals produced using an organic template can vary. For example, Studies in Surface Science and Catalysis 33, "Synthesis of High Silica Aluminosilicate Zeolites" (Elsevier), Peter A. Jacobs and Johan A. Martens illustrates ZSM-5 crystals which are large elongated hexagonal prisms, whose corners may be rounded. Crystals of ZSM-5 zeolite which are agglomerates of smaller, elementary hexagonal crystallites are also illustrated. In the presence of an extremely high proportion of silica (e.g. U.S. Pat. No. 4,797,267), ZSM-5 crystals may be rod shaped i.e. elongated crystals with substantially parallel sides and blunt ends. The morphology of inorganic ZSM-5 crystals tends, according to Zeolites (ibid), to be ellipsoidal.

There is evidence to suggest that inorganic ZSM-5 zeolite and ZSM-5 zeolites produced by organic templated synthesis differ in terms of the relative positions of atoms in their structures. In templated synthesis, there is evidence for occurrence of aluminium zoning (see e.g. Jacobs and Martens, ibid). In inorganic ZSM-5 it is believed that the Al atoms are homogeneously distributed over the T-atom sites. NMR spectra of ZSM-5 zeolites prepared using an organic template, specifically $^{29}Si$ NMR spectra, show two peaks: one at $-111$ ppm corresponding to Si with no Al neighbours, and one at $-105$ ppm corresponding to Si with one Al atom as a nearest neighbour in a T-atom site.

The applicants have now identified a novel form of ZSM-5 zeolite. The zeolites of the present invention are tectosilicates. They contain silicon and aluminium, although some or all of the aluminium may be replaced with another element e.g. gallium, boron, iron, zinc or copper. For simplicity the following text will refer to aluminium but unless otherwise stated this should not be taken to imply a limitation.

The present invention provides a crystalline ZSM-5 zeolite, preferably an aluminosilicate zeolite, which comprises substantially needle-shaped agglomerates.

By needle-shaped it is intended to mean that the agglomerates are substantially rod-shaped having gently tapering ends (i.e. not blunt ended like coffin-shaped crystals) and where the average ratio of length to diameter (measured at the thickest part of the needle) is at least 2.5, preferably at least 3.

The ends of the agglomerate taper, preferably so that the length of the portion of the agglomerate having a diameter less than the maximum diameter, is at least 50%, preferably at least 60%, more preferably at least 70% of the total length of the agglomerate. Typically the average length of the needle-shaped agglomerates is of the order 0.2 to 10 µm, preferably 0.4 to 5 µm. Substantially all the ZSM-5 zeolite agglomerates may be needle-shaped, i.e. at least 80%, preferably at least 90%, more preferably at least 95% of the agglomerates are needle-shaped.

Each needle-shaped agglomerate may be made up of much smaller crystals agglomerated together. The smaller crystals are generally much less than 1 µm in size e.g. 0.05 to 0.5 µm. The shape of the smaller crystals which form the needle-shaped agglomerate is believed not to be critical. The crystals may, for example, be rod- or needle-shaped.

The needle-shaped agglomerates tend to have a square cross-section, although the crystals forming the agglomerate may be joined together such that the corners of the square are blunted, leading to a more circular cross-sectiom. One effect of the needles being formed from an agglomeration of smaller crystals is that the needles when viewed by a scanning electron micrograph (SEM) display a textured or grainy surface. An increased outer surface area of zeolite may be useful in some processes (see e.g. D. Fraenkel. Ind. Eng. Chem. Res. 29 No. 19 1990 1814–1821 and the references mentioned in it) and may influence e.g. access to internal active sites or may be useful in external and pore mouth catalysis. ZSM-5 prepared using an organic template generally has a $^{29}Si$ NMR spectrum showing two peaks corresponding to Si-atoms having in the nearest neighbour T-atom sites 0 or 1 Al atoms respectively.

The present invention further provides a tectosilicate ZSM-5 zeolite whose $^{29}Si$ NMR spectrum has at least three peaks, which peaks correspond to Si having 0, 1 and 2 nearest neighbour atoms respectively. When the zeolite is an aluminosilicate the third peak, which is believed to correspond to Si atoms having 2 (or possibly even 3) Al atoms as neighbours is at less than $-105$ ppm. Generally, the peak is in the region from $-85$ to less than $-105$ ppm.

Figure 1:
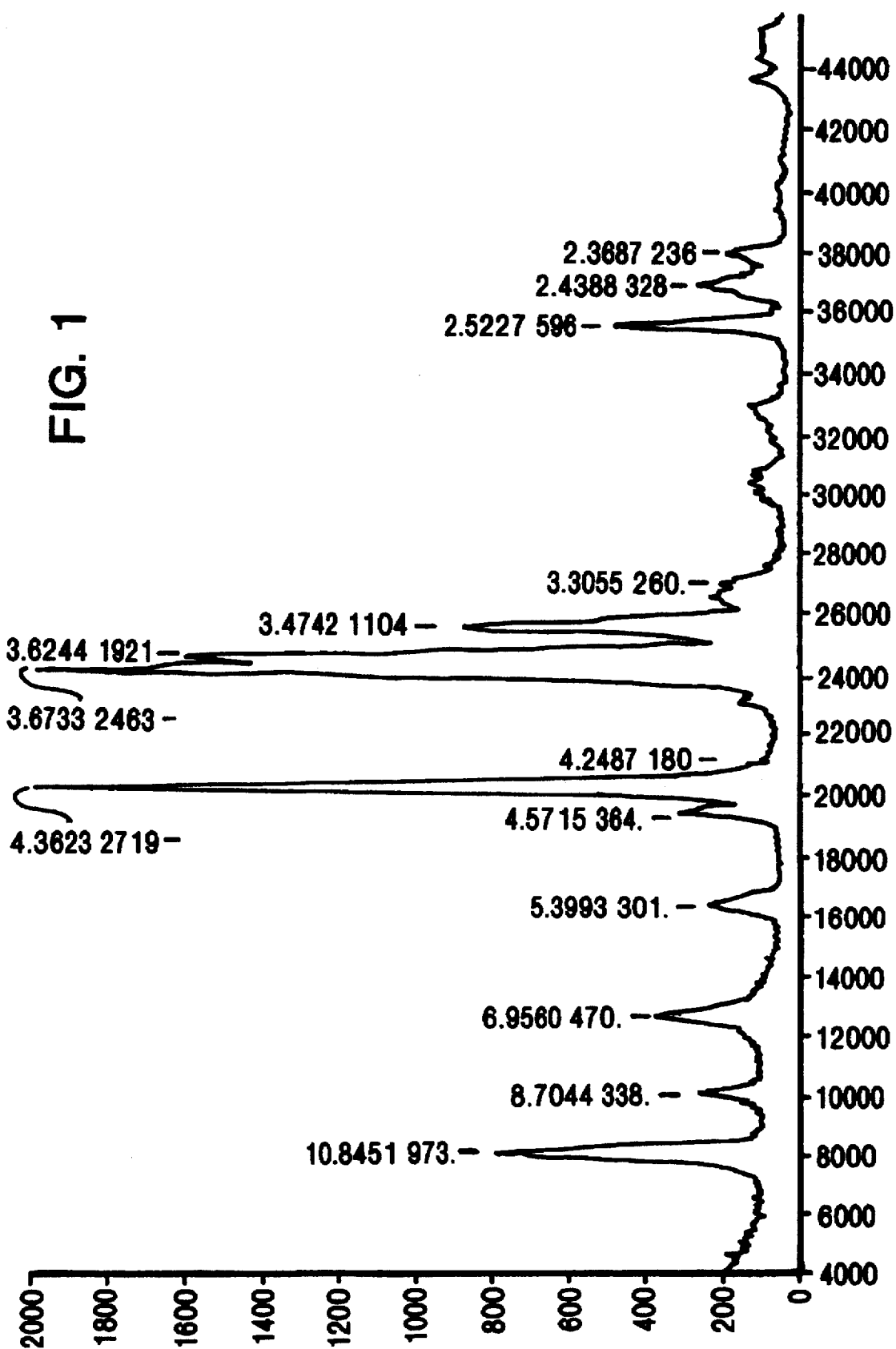
FIG. 1 is a x-ray diffractogram of the product of Comparative Example 2.

The zeolites of the invention may be prepared by crystallising a synthesis mixture comprising:

(i) a source of silicon;

(ii) a source of aluminum, gallium, boron, iron, zinc or copper (denoted as M);

(iii) a source of monovalent cation;

(iv) an organic structure directing agent; and, (v) if the synthesis mixture is agitated during crystallisation and the ratio of Si to M is 20 or more, from 0.05 to 2000 ppm wt based on wt of synthesis mix of seed crystals of MFI zeolite having an average largest dimension of not more than 100 nm.

The source of silica is not critical and may be for example a colloidal silica solution e.g. that is sold under the trade name Ludox, or may be a finely divided solid, e.g. that sold under the trade name Aerosil. po The source of aluminium may be an alumina introduced into the synthesis mixture as e.g. $Al_2O_3 \cdot 3H_2O$ previously dissolved in alkali e.g. $Al_2(SO_4)_3 \cdot 18H_2O$ dissolved in an alkali solution. Likewise, suitable sources of gallium, iron, boron, zinc and copper will be apparent to the skilled person.

The synthesis mixture should contain a source of a monovalent cation such as an alkali metal, e.g. sodium, potassium or caesium or a source of ammonium ions. For needle-shaped agglomerates, a potassium source should be used. This can conveniently be provided in the form of a hydroxide to provide an alkaline solution in which the alumina may be introduced.

The organic structure directing agent directs the formation of a given molecular sieve by the so-called templating effect. The role of organic molecules in molecular sieve synthesis is discussed in articles published in the literature, e.g. Lok et al Zeolites 1983, Volume 3, pages 282 to 291 and Moretti et al, Chim. Ind. (Milan) 67, No. 1 to 2, 21 to 34(1985). The effect of an organic structure directing agent is that in the production of the crystalline framework the organic compound behaves like a template around which the crystalline framework grows, or which causes the crystallisation to be directed to form a particular crystalline framework. Examples of structure directing agents which may be used to form the present zeolites include alkylamines and diaminoalkanes having up to 12 carbon atoms, particularly 4, 6, 8, 10 or 12 carbon atoms, e.g. 1,6-diaminohexane, diethylamine, 1-aminobutane or 2,2'-diaminodiethylamine; heterocyclic organic compounds such as N-ethylpyridinium; polyalkylenepolyamines, e.g. triethylene tetramine or tetraethylenepentamine; and alkanolamines, e.g. ethanolamine or diethanolamine.

A suitable amount of template R, based on the preferred template of 1,6-diaminohexane, is a molar ratio of $R/SiO_2$ in the synthesis mixture of 0.1 to 0.5.

The $SiO_2/Al_2O_3$ molar ratio in the synthesis mixture is generally not more than 500 and may be as low as 6, i.e. the Si/Al ratio in the zeolite synthesis mixture is generally from 3 to 250. The $SiO_2/Al_2O_3$ molar ratio in the synthesis mixture may be from 6 to 500 for the production of needle-shaped agglomerates, preferably 15 to 100. For a zeolite having three $^{29}Si$ NMR peaks, particularly one including a peak at less than −105 ppm, an $SiO_2/Al_2O_3$ molar ratio of 6 to 50 in the synthesis mixture should be used, preferably 15 to 25.

The $SiO_2/Al_2O_3$ molar ratio in the zeolite after crystallisation tends to be up to 30% lower than the molar ratio in the synthesis mixture. Thus the $SiO_2/Al_2O_3$ molar ratio in the zeolite is generally not more than 500 and maybe as low as 5.

The formation of needle-shaped agglomerates is encouraged by the selection of appropriate alkalinity of the synthesis mixture, having regard to the quantity of silicon source present. If the alkalinity of the synthesis mixture is expressed in terms of moles of $OH^-$ present, the molar ratio of $OH^-/SiO_2$ should be in the range 0.025 to 0.34, preferably, 0.05 to 0.30. Decreasing the $OH^-/SiO_2$ molar ratio tends to increase the length/diameter ratio of the needle-shaped agglomerates formed. When calculating the amount of $OH^-$ present in the synthesis mixture, account should be taken of any materials present which may neutralise some $OH^-$ ions. For example, if the aluminium source is added to the solution in the form of aluminium sulphate, $Al_2(SO_4)_3$, one mole of aluminium sulphate will neutralise six moles of $OH^-$ ions.

It is believed that to obtain both needle-shaped agglomerates and a ZSM-5 zeolite having a $^{29}Si$ NMR containing three peaks, the $SiO_2/Al_2O_3$ molar ratio in the synthesis mixture should be not more than 25, and the $OH^-/SiO_2$ molar ratio should not be more than 0.21.

The crystallisation of the synthesis mixture may be carried out under quiescent conditions (i.e. no stirring) or the mixture may be stirred throughout the crystallisation time. Under quiescent conditions, regardless of whether the mixture is seeded, ZSM-5 should be produced. If needle-shaped agglomerates are desired, seeds of an MFI-zeolite may be added to the synthesis mixture to encourage the production of small, uniform needle-shaped agglomerates. If the mixture is stirred, then, when the $SiO_2/Al_2O_3$ molar ratio is initially around 45, the synthesis mixture may be suitable for the preparation of ZSM-22 crystals in the absence of MFI zeolite seeds. Thus, seeds are beneficial for the production of small uniform agglomerates, and are required to produce ZSM-5 if the synthesis mixture has an $SiO_2/Al_2O_3$ molar ratio of around 40 or more (Si/Al atomic ratio of 20 or more), and the mixture is stirred during crystallisation.

The synthesis process preferably used from 0.05 to 2000 ppm, preferably 0.1 to 1500 ppm, more preferably 50 to 1500 ppm of seed crystals of MFI zeolite. The seed crystals are preferably "nanometer size" i.e. their average largest dimension is not more than 100 nm. The seed crystals may be any MFI zeolite, for example a ZSM-5 zeolite or, conveniently, a silicalite. The seed crystals may conveniently be added in the form of e.g. a colloidal suspension. Suitable seed crystals may be prepared as described in our pending UK Patent Application No: 9122499.8 (filed 23 Oct. 1991).

If the crystallisation is carried out under quiescent conditions, or, regardless of whether the mixture is stirred, if the $SiO_2/Al_2O_3$ molar ratio is less than 40, seeds are not required to produce ZSM-5 zeolite. However, since the production of small, uniform crystals and agglomerates are encouraged by the use of seeds, it is preferred to include seeds in the synthesis mixture.

In general, the crystallisation temperature is 120° to 200° C., typically 130° to 180° C. The crystallisation time may be from 30 to 200 hours, typically 50 to 145 hours. The time to obtain a crystalline product depends strongly on the alkalinity of the synthesis mixture. The lower the alkalinity, the longer the mixture needs to be held at a given temperature to obtain a crystalline product. Temperature also affects the length/diameter ratio of the agglomerates produced. Increasing the temperature tends to increase the length/diameter ratio, producing thinner and longer agglomerates.

After crystallisation the zeolite may be washed and dried, and optionally, calcined.

The zeolite can be modified by methods known by people skilled in the art, such as ion-exchange, impregnation, dealumination or any other chemical modification.

Ion-exchange typically replaces residual cations and hydrogen ions by a cation such as ammonium, an alkali metal cation, a rare earth metal cation or cations of manganese, calcium, magnesium, zinc, calcium, palladium, nickel, copper, titanium, tin, iron, platinum or cobalt.

Impregnation allows deposition of metal salts on the zeolite, e.g. salts of noble metals.

Dealumination can be done e.g. by steaming or by any chemical treatment. These treatments result in modifying the zeolite framework composition.

The zeolite may be bound with a matrix material such as clay or silica to increase the physical strength of the material for its use as a catalyst in a variety of processes.

ZSM-5 zeolites are useful in the production and conversion of organic compounds, for example cracking, hydrocracking, dewaxing, isomerisation (including e.g. olfin summarization and skeletal summarization e.g. of butane), oligomerisation, dimerisation, polymerisation, alkylation, dealkylation, hydrogenation, dehydrogenation, dehydration, cyclisation and aromatisation. The present invention therefore provides a process for the production or conversion of an organic compound comprising the use of a catalyst of the zeolite described above. The zeolite can also be used (either as initially prepared or in a modified form) in a selective adsorption process e.g. a separation or purification.

The zeolite may be calcined if appropriate before use. It may also be cation exchanged or used in acid form. It may be used in a dehydrated form or a fully or partially hydrated form.

The following examples illustrate aspects of the invention:

COMPARATIVE EXAMPLE 1

| Preparation of synthesis mixture: | |
|---|---|
| Solution A: | |
| INGREDIENTS | QUANTITY IN GRAMS |
| $Al_2(SO_4)_3 \cdot 18\ H_2O$ (Baker, prod. #1889) | 5.183 |
| KOH pellets (87.5%) (Baker, prod. #0222) | 5.83 |
| 1,6-diaminohexane (Fluka, prod. #33000) | 12.58 |
| $H_2O$ | 125.02 |
| Rinse $H_2O$ | 99.99 |

The ingredients were dissolved in the water in the order shown above. The rinse water was used to rinse the beaker which contained solution A.

| INGREDIENTS | QUANTITY IN GRAMS |
|---|---|
| Solution B: (Silicate) Ludox AS-40 | 54.06 |
| Component C: ZSM-22 Seed Crystals | 0.32 |

Solution A and the rinse water were added to Solution B. The resutlting mixture was stirred for 5 minutes. The ZSM-22 seed crystals were then added to this mixture and the whole was vigorously stirred for 10 minutes. The resulting synthesis mixture had a molar composition of:

1.26 $K_2O$/3.01 $R$/0.22 $Al_2O_3$/10 $SiO_2$/402 $H_2O$ where R is 1, 6-diaminohexane. The $OH^-$/$SiO_2$ molar ratio was 0.12.

This mixture contained 0.11 wt % of ZSM-22 seed crystals, based on the weight of the synthesis mixture. The $SiO_2$/$Al_2O_3$ molar ratio was 45.5.

The synthesis mixture was transferred to a 300 ml stainless steel autoclave. The autoclave was placed in a room temperature oven. The oven was heated-up to 160° C. within 2 hours and kept at this temperature for 59 hours.

The product was washed with water to pH 9.7 and subsequently dried at 100° C.

X-Ray diffraction (XRD) showed that the product was ZSM-22 slightly contaminated with ZSM-5.

COMPARATIVE EXAMPLE 2

An identical synthesis mixture as in comparative example 1, not containing ZSM-22 seed crystals was crystallised in a 2 liter stainless steel "stirred" autoclave. The crystallisation conditions were: heat-up time to 160° C.: 2.5 hours; time held at 160° C.: 65 hours, stirring speed, 120 rpm. XRD showed that the product was excellently crystalline and pure ZSM-22.

EXAMPLE 1

Using the same ingredients and procedure as described in Comparative Example 2 a synthesis mixture was prepared in which the $SiO_2$/$Al_2O_3$ molar ratio was reduced from 45.5 to 36.1. This mixture was crystallised with the same conditions as in Comparative Example 2. The resulting product was pure ZSM-5. The morphology of the crystals was irregular but showed a needle-type character.

Figure 2:
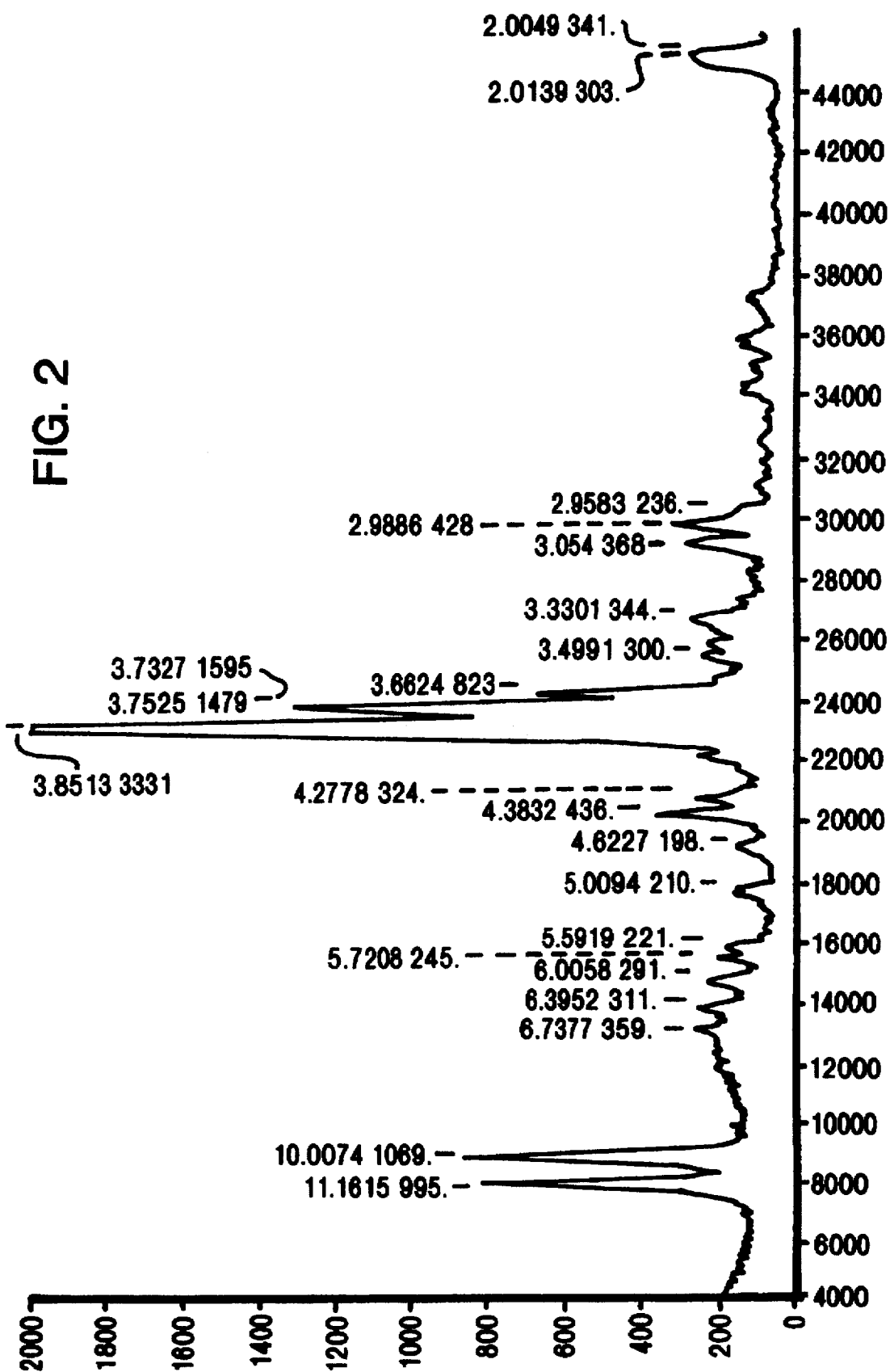
FIG. 2 is a x-ray diffractogram of the product of Example 1.

Comparative X-Ray diffractograms of the products obtained from Comparative Example 2 and Example 1 are given in FIGS. 1 and 2.

EXAMPLE 2

The synthesis described in Example 1 was repeated but in this case the synthesis mixture was seeded with a colloidal suspension of nanometer sized silicalite crystals.

SYNTHESIS OF NANOMETER-SIZED SILICALITE CRYSTALS

Preparation of synthesis solution. The weight of each reactant is given in grams and the product number of each reactant is given in brackets after the Manufacturer's/Supplier's name.

| TPA OH solution (20% in water) | 406.34 | (Fluka 88110) |
|---|---|---|
| Silicic acid powder (10.2 wt % $H_2O$) | 87.94 | (Baker 0324-5) |
| NaOH pellets (98.4%) | 5.73 | (Baker 0402) |

The TPA-solution was weighed in a 1 liter glass beaker, the NaOH was added and the solution stirred at room temperature until the NaOH dissolved. Next, the silicic acid was added and the mixture heated to boiling whilst vigorously stirring. Heating was continued until a clear solution was obtained. The solution was cooled to room temperature and the weight loss due to the boiling was corrected with demineralized water.

The molar composition of the synthesis mixture was:

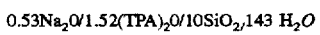

0.53$Na_2O$/1.52$(TPA)_2O$/10$SiO_2$/143 $H_2O$

The $OH^-$/$SiO_2$ molar ratio was 0.41.
Crystallisation

The synthesis solution was divided into 3 portions which were crystallized at respectively 120° C. for 22 hours, 80° C. for 25.5 hours and at 60° C. for 9 days. The crystallization at 120° C. was done in a 1 liter stainless steel autoclave; the other crystallisations were done in 250 ml plastic bottles. The crystals were separated from the motherliquor using a high-speed centrifuge. Upon centrifuging the crystals appeared as a bluish transparent gel-like mass on the bottom of the centrifuge beakers.

To wash the product, the crystals were redispersed in demineralized water using an ultrasonic bath and were subsequently centrifuged. The washing was repeated until the pH of the last wash water was about 10. After the last washing step the crystals were again dispersed in about 100 ml of the demineralized water. After standing for about a week the 80° C. and 60° C. crystals did not show a tendency to settle down on the bottom of the container, therefore the 80° C. and 60° C. crystals were considered as "colloidal zeolites". Small portions (about 25 grams) of the zeolite suspensions were evaporated to dryness (16 hours at 120°) and the resulting solids were air calcined for 24 hours at 550° C. X-ray diffraction of the products all showed the pattern of silicalite-1.

SYNTHESIS OF ZSM-5

The molar composition of the synthesis mixture was:

1.26$K_2O$/3.01 R/0.277 $Al_2O_3$/10 $SiO_2$/404 $H_2O$ and contained 0.010 wt % seed crystals, based on the weight of the synthesis mixture. R is 1,6-diaminohexane. The $OH^-/SiO_2$ molar ratio was 0.09.

Crystallisation

The synthesis mixture was transferred to a 1 liter stainless steel autoclave. The synthesis mixture was heated-up from room temperature to 160° C. within 2.5 hours. The mixture was kept at this temperature for 130 hours. During heating the mixture was stirred at 120 rpm.

Washing and Recovery

The product was washed with water to pH 9.7 and dried at 120° C. during 20 hours.

Characterisation

Figure 3:
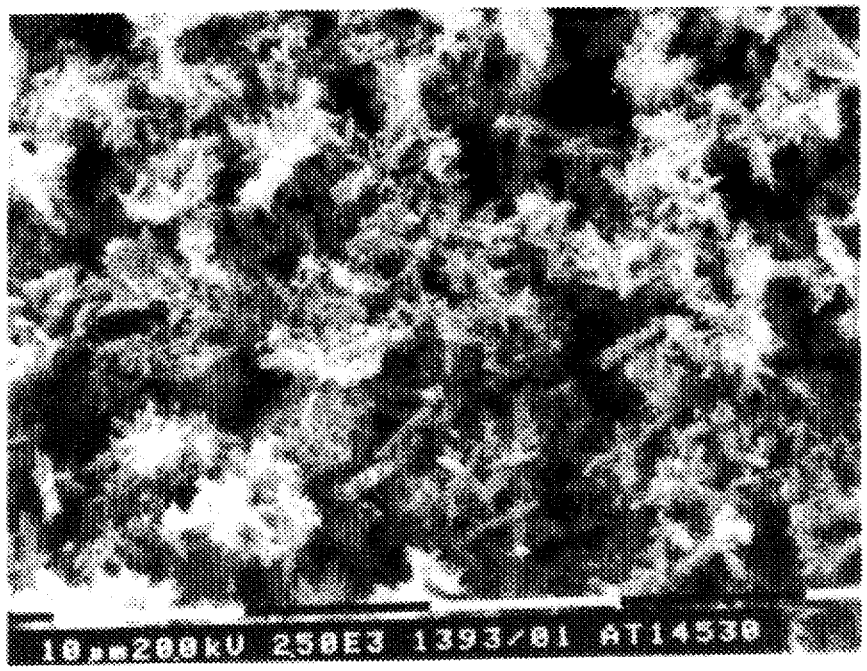
FIG. 3 is a SEM micrograph of the product of Example 1.
Figure 4:
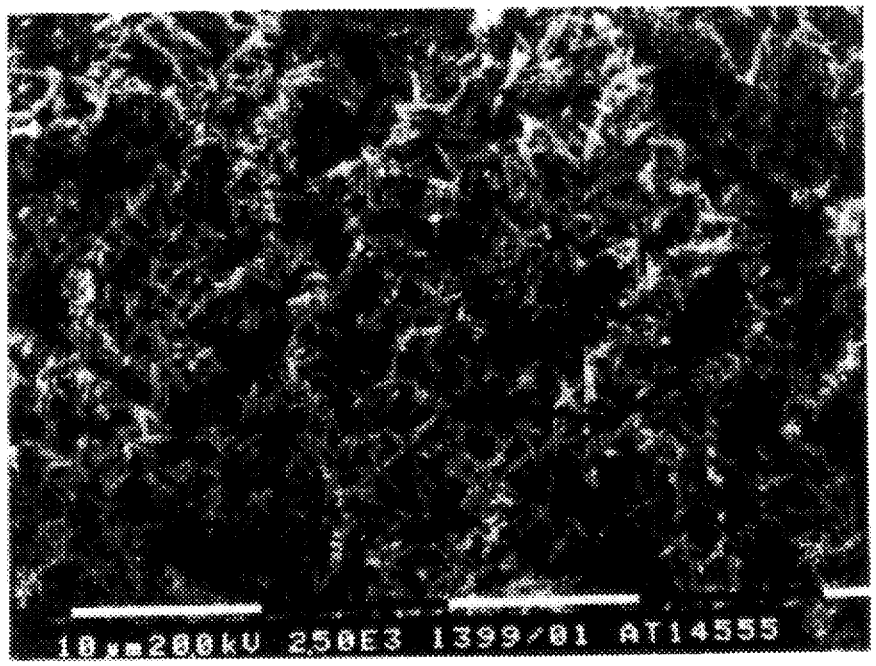
FIG. 4 is a SEM micrograph of the product of Example 2.

XRD showed that the product was excellently crystalline ZSM-5. SEM micrographs showed that the product consisted of uniform needles with a length/diameter ratio of about 6.7. Comparative SEM micrographs of the products obtained from Examples 1 and 2 are given in FIGS. 3 and 4.

It can be seen from this that decreasing the $SiO_2$/$Al_2O_3$ molar ratio of the synthesis mixtures from ~45 to < 40 significantly enhances the formation of zeolite ZSM-5 at the expense of zeolite ZSM-22; a needle-type morphology of zeolite ZSM-5 can be prepared; seeding the synthesis mixture with very small quantities of nanometer sized silicalite crystals enhances the formation of very uniform (needle-type) ZSM-5 crystals.

EXAMPLE 3

Crystallisation of a colloidal silicalite-seeded synthesis mixture with $SiO_2/Al_2O_3$ molar ratio of ~90.

| Preparation of synthesis mixture: | |
|---|---|
| solution A: INGREDIENTS | QUANTITY IN GRAMS |
| $Al_2(SO_4)_3$.18 $H_2O$ (Baker, prod. #1889) | 8.17 |
| KOH pellets (87.5%) (Baker, prod. #0222) | 18.52 |
| 1,6-diaminohexane (Fluka, prod. #33000) | 39.83 |
| $H_2O$ | 553.00 |
| Rinse $H_2O$ | 158.84 |

The ingredients were dissolved in the water in the order shown above. The rinse water was used to rinse the beaker which contained Solution A.

| INGREDIENTS | QUANTITY IN GRAMS |
|---|---|
| Solution B: (silicate) Ludox AS-40 (40% $SiO_2$) | 170.89 |
| Solution C: seed crystals Colloidal suspension of silicalite crystals in water containing 12.5 wt % solids | 1.1448 |

Solution A and the rinse water were added to Solution B. The resulting mixture was mixed for 5 minutes using a magnetic stirrer. Next, the silicalite suspension was added and the whole was again mixed for 5 minutes. A homogeneous, slightly opaque mixture was obtained. The molar composition of the synthesis mixture was:

1.27 $K_2O$/3.02 R/0.108 $Al_2O_3$/10 $SiO_2$/402 $H_2O$ $SiO_2/Al_2O_3$ molar ratio=92.6. $OH^-/SiO_2$ molar ratio=0.19. R=1,6-diamino hexane.

The synthesis mixture contained 150 wt ppm silicalite seed crystals.

Crystallisation

The synthesis mixture was divided over 2 autoclaves: 637.00 gr of the synthesis mixture was transferred to a 1 liter stainless steel "stirred" autoclave, while 309.87 gr was transferred to a 300 ml stainless steel "static" autoclave. The 1 liter autoclave was heated-up from room temperature to 160° C. within 2.5 hours and was kept at this temperature for 130 hours. During the crystallisation the mixture was stirred at 120 rpm.

Washing and Recovery of Product

The product from the 1 liter autoclave was washed with water to pH 9.0. The 300 ml-product was washed to pH 9.2. Both products were dried at 110° C. for 6 hours. The quantity of product recovered was: 45.5 gr for the 1-liter autoclave and 21.8 gr for the 300 ml autoclave. This corresponds with a product yield of respectively 7.1 and 7.0 wt %. The product yield is defined as the weight ratio dry product/synthesis mixture in autoclave * 100%.

Characterisation

XRD showed that both products were excellently crystalline and pure ZSM-5. SEM micrographs showed that the crystals were very uniform and that the length/diameter ratio of the crystals was ~2.3.

EXAMPLE 4

Effect of gel alkalinity on ZSM-5 agglomerate l/d ratio.

Using the same ingredients and procedure as described above a synthesis mixture was prepared in which the potassium content was reduced. The molar composition of the synthesis mixture was:

0.58 $K_2O$/3.03 R/0.108 $Al_2O_3$/10 $SiO_2$/402 $H_2O$, $OH^-/SiO_2$ molar ratio=0.05

The synthesis mixture was seeded with 100 wt ppm colloidal silicalite seed crystals. The mixture was crystallised in a 300 ml stainless steel autoclave at 160° C. for 194 hours. After washing and drying, the product was characterised by XRD and SEM.

XRD showed that the product was excellently crystalline and pure. SEM showed that the product consisted of well defined needle type agglomerates with a length of 2.2. microns and a diameter of 0.45 microns; the l/d ratio of the agglomerates was 4.9.

This experiment shows that the $OH^-/SiO_2$ molar ratio of the synthesis mixture is an important parameter in determining the l/d ratio ratio of the needle type zeolite.

EXAMPLE 5

Crystallisation of a colloidal silicalite-seeded synthesis mixture with $SiO_2/Al_2O_3$ molar ratio of ~ 60.

Using the same ingredients and procedure as described above a synthesis mixture was prepared with a molar composition of:

1.27 $K_2O$/3.02 $R$/0.167 $Al_2O_3$/10 $SiO_2$/402 $H_2O$+100 wt ppm seed crystals. $SiO_2/Al_2O_3$ molar ratio:59.9. $OH^-/SiO_2$ molar ratio:0.15.

Crystallisation

The synthesis mixture was divided over a one-liter "stirred" autoclave and a 300 ml "static" autoclave. The crystallisation conditions were the same as in Example 3.

Washing and Recovery

Both products were washed to pH 9.3 and dried overnight at 105° C. The product yields for both batches were 7.7 wt %.

Characterization

Figure 5:
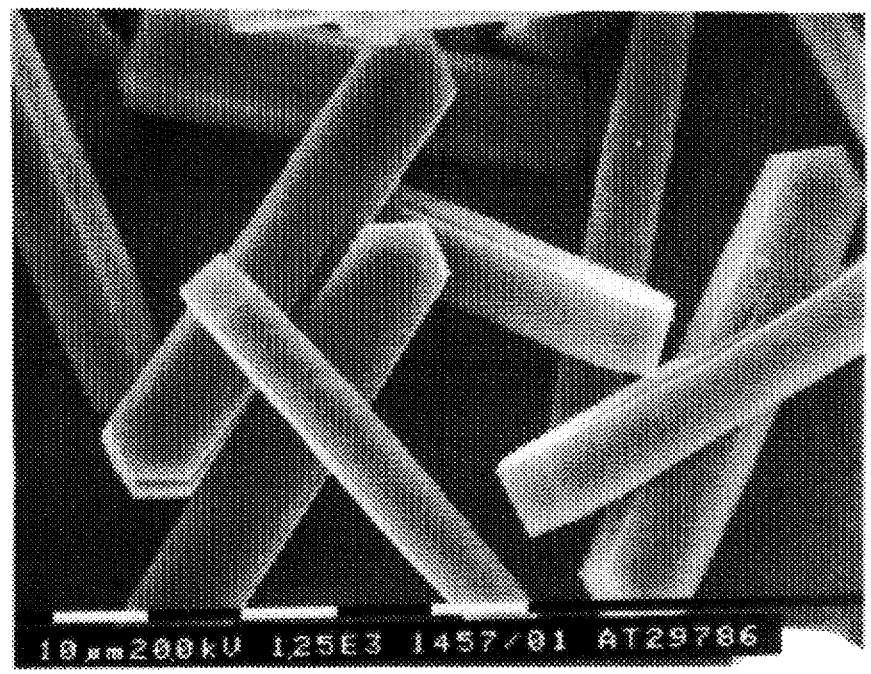
FIG. 5 is a SEM micrograph of the "coffin"-type crystals of Example 5.
Figure 6:
FIG. 6 is a SEM micrograph of the agglomerated crystals of Example 5.

XRD showed that both products were excellently crystalline and pure ZSM-5. SEM micrographs of both products showed that the crystals were very uniform in shape and size, and had an l/d ratio of 3.2. It appeared that the morphology of the crystals completely differed from that of a so-called "coffin"-type crystals. The main visual difference between these 2 types of crystals is that a coffin is a very smooth and uniform "single"crystal having less tapering ends, while the product of the invention consists of agglomerated crystals forming a particle with an l/d ratio of > 2.5 preferably > 3. Comparative SEM micrographs of both morphologies are given in FIGS. 5 and 6.

EXAMPLE 6

Cyrstallisation of a colloidal silicalite-seeded synthesis mixture with $SiO_2/Al_2O_3$ molar ratio of 40. A synthesis mixture was prepared with a molar composition of:

1.27 $K_2O$/3.02 $R$/0.250 $Al_2O_3$/10 $SiO_2$/403 $H_2O$ containing 100 wt ppm colloidal silicalite seeds. The $OH^-/SiO_2$ molar ratio was 0.10.

Crystallisation

The synthesis mixture was divided over a 2 liter "stirred" autoclave and a 300 ml "static" autoclave. The crystallisation conditions were the same as in Example 3.

Washing and Recovery

Both products were washed to pH9.4 and subsequently dried at 120° C. for 16 hours. The product yields were 8.3 wt %.

Characterisation

Figure 7:
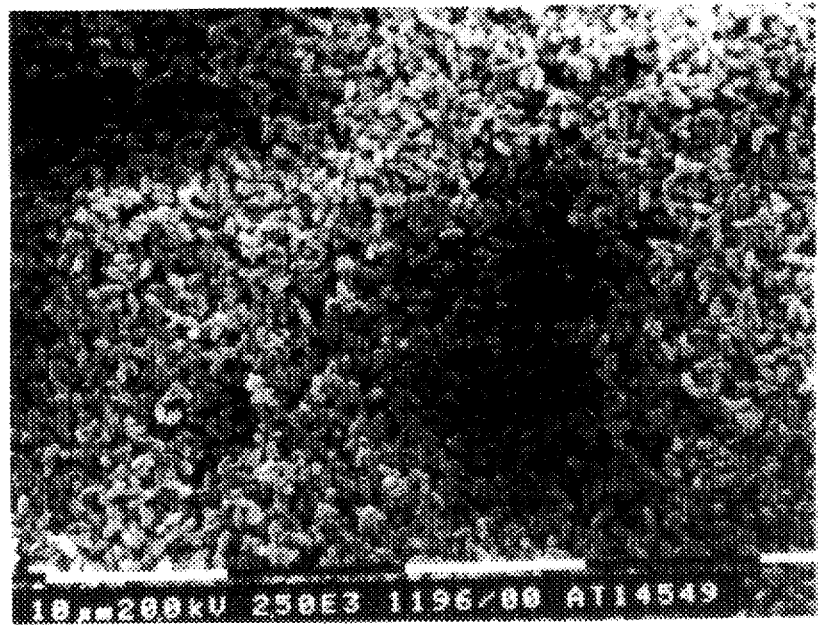
FIG. 7 is a SEM micrograph of the product of Example 3.
Figure 8:
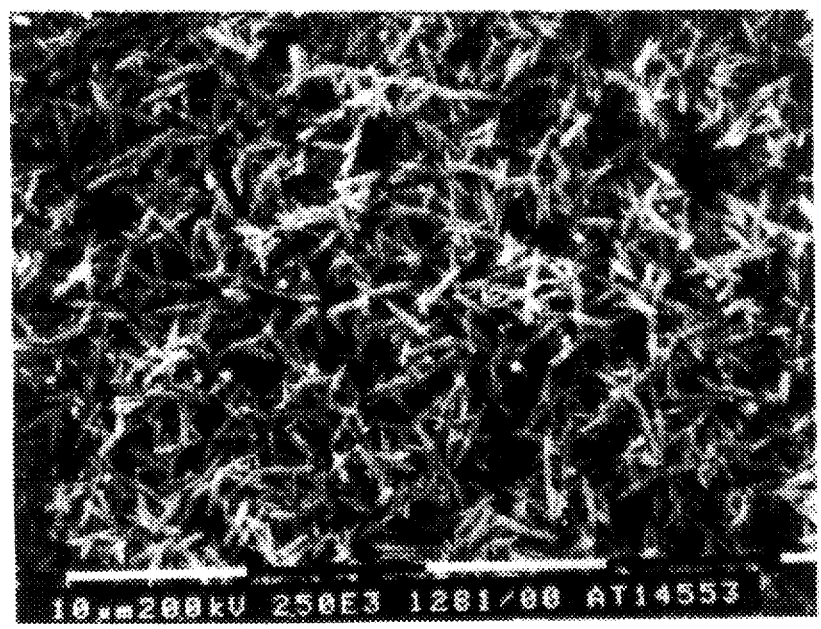
FIG. 8 is a SEM micrograph of the product of Example 6.

XRD showed that both products were pure ZSM-5. SEM showed that both products had the same shape/size and the l/d ratio of the crystals was 6.5. Comparative SEM micrographs of the products obtained from Examples 3 and 6 are given in FIGS. 7 and 8.

EXAMPLE 7

The effect on particle morphology of Potassium being replaced by sodium.

This is a duplication of Example 6 in which the potassium is replaced by sodium. Preparation of synthesis mixture (wt reactants in grams)

| A. Ludox AS-40 | 62.26 | |
| B. $Al_2(SO_4)_3.18H_2O$ | 6.90 | (Baker) |
| NaOH (98.4%) | 4.27 | (Baker) |
| 1,6-diaminohexane | 14.52 | (Fluka) |
| $H_2O$ | 201.44 | |
| Rinse $H_2O$ | 57.87 | |
| C. Seed | 0.2812 | |
| 12.5% solids in $H_2O$ | | | wt synthesis mixture prepared 347.54
Composition synthesis mixture (moles)

1.27$Na_2O$/3.02 $R$/0.25 $Al_2O_3$/10 $SiO_2$/403 $H_2O$ containing 101 wt ppm seeds, $OH^-/SiO_2$=0.104;$SiO_2/Al_2O_3$=40.

Crystallisation:

281.50 g of gel was transferred to a 300 ml stainless steel autoclave. The autoclave was placed in a room temperature oven which was heated up to 160° C. within 2 hours and was kept at this temperature for 132 hours.

The product was washed to pH9.5 and was dried over the weekend at 120° C. weight of product obtained 22.7 g.

Calculated $Si/Al_2$ ratio = 37.
The calculations we make as follows.
Assumptions:

all Al present in the synthesis mixture is incorporated into the zeolite

Figure 9A:
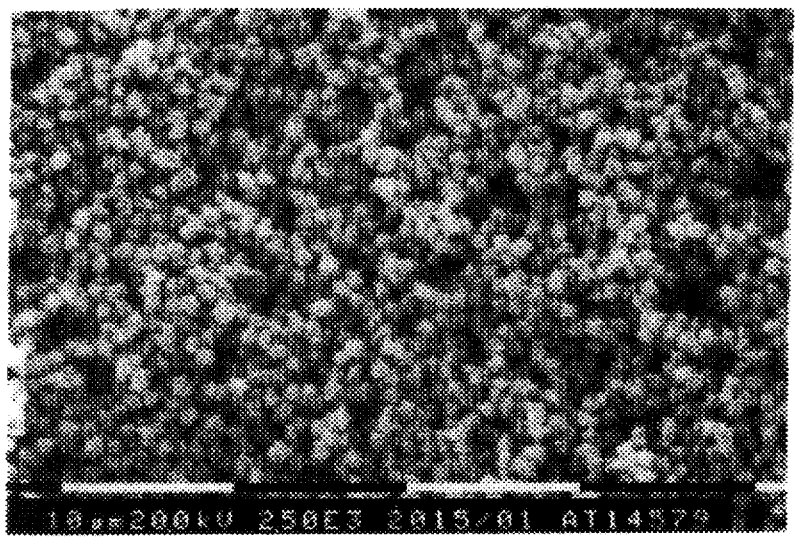
FIG. 9 is a SEM micrograph of the product of Example 7.
Figure 9B:
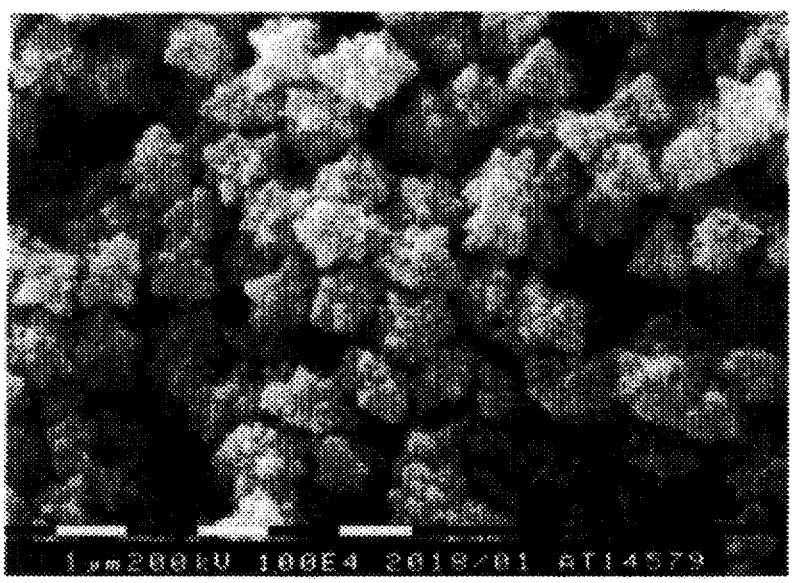
Figure 9C:
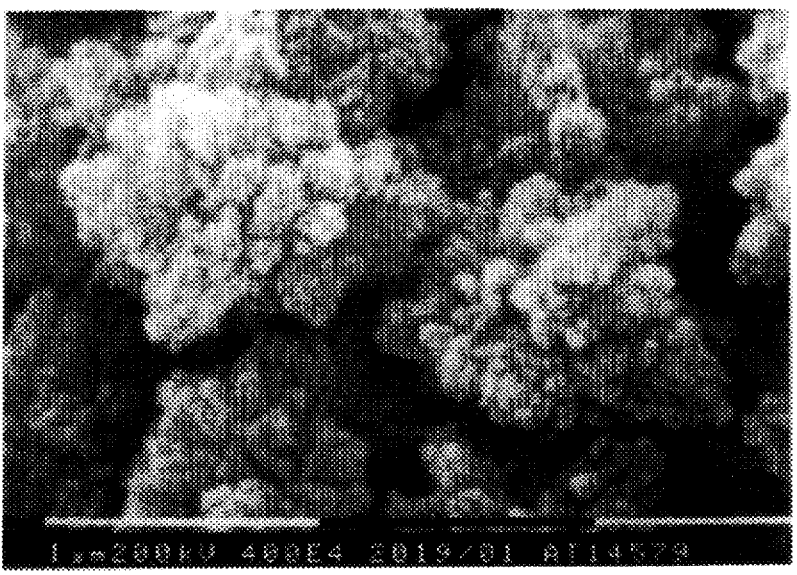

K/Al atomic ratio of the zeolite—unity.
Calculation $Si/Al_2$ atomic ratio example of: moles $Al_2O_3$ in autoclave:

$$\frac{281.50}{357.54} \times 6.90 \times \frac{1}{666.92} = 0.00839 \text{ in sulphate.}$$

moles $Al_2O_3$ + $K_2O$ in zeolite: 0.00839. weight of $Al_2O_3$ + $K_2O$ in zeolite = 0.00839 (101.96 + 94.2) = 1.65 grams.

weight of dry product obtained: 22.7 gr
LOI (loss of template): ~10%.
weight of calcined product: 20.43 gr
weight of $SiO_2$ in zeolite: 20.43 − 1.65 = 18.78 gr moles $SiO_2$ in product $\frac{18.78}{60.09} = 0.31253$ $Si/Al_2$ at ratio of product: $\frac{0.31253}{0.00839} \sim 37$ The SEM micrograph of the product is shown in FIG. 9. It can be seen from this that needle-shaped agglomerates are not produced.

EXAMPLE 8

Crystallisation of a colloidal silicalite-seeded synthesis mixture with $SiO_2/Al_2O_3$ molar ratio of ~ 30 and $OH/SiO_2$ ratio of 0.06. A synthesis mixture with molar composition:

1.27 $K_2O$/3.07 $R$/0.33 $Al_2O_3$/10 $SiO_2$/403 $H_2O$ was prepared containing 98 wt ppm colloidal silicalite seeds and was aged in a 1-liter autoclave at 160° C. with stirring at 120 rpm for 152 hours. The product was excellently crystalline and consisted of small needles with a length between 0.4 and 1.0 microns and with a diameter between < 0.1 and 0.2 microns. The average l/d ratio was ~ 6.5.

It can be seen from Examples 3 and 5 that seeding zeolite synthesis mixtures suitable for the formation of zeolite ZSM-22 with ppm quantities of zeolite ZSM-5 crystals completely avoids the formation of ZSM-22, while the formation of zeolite ZSM-5 is significantly promoted; stirring during the synthesis of needle-shaped ZSM-5 crystals does not affect crystal morphology, size or l/d ratio.

$^{29}$Si NMR SPECTRA
Synthesis of sample (Example 11)
A synthesis mixture was prepared with molar composition:

2.91 $K_2O$/3.02 R/0.50 $Al_2O_3$/10 $SiO_2$/409 $H_2O$ $OH^-/SiO_2$ molar ratio = 0.28

The synthesis mixture was seeded with 101 wt ppm colloidal silicalite crystals. Of the synthesis mixture 300.73 g was transferred to a 300 ml stainless steel autoclave.

Crystallisation:

The autoclave was placed in a room temperature oven which was heated up within 2 hours to 160° C. and kept for 142 hours at this temperature.

Washing and Recovery:

The product was washed with demineralised water until the pH of the last wash water reached 9.8. The product was dried at 120° C. for 18 hours. The quantity of product obtained was 22.6 grams.

Characterisation:

XRD showed the product was excellently crystalline ZSM-5.

SEM showed that the product consisted of needle shaped agglomerates with a length of 2.1 microns and with a diameter of 0.8 microns, the l/d ratio of the agglomerates was 2.6.

Figure 10:
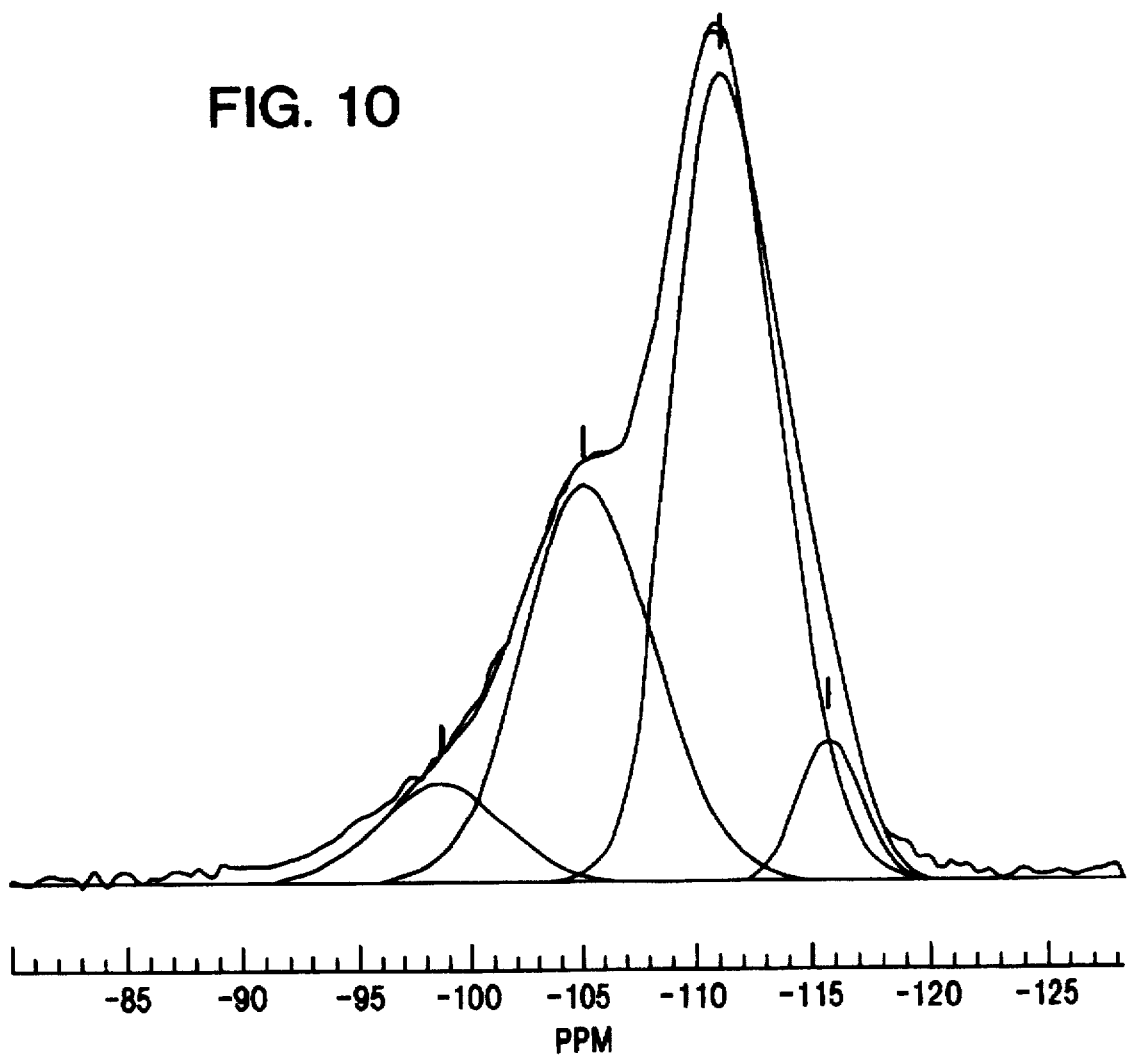
FIG. 10 is a 29 Si NMR spectrum of the product of Example 11.

The $^{29}$Si NMR spectrum was taken of the sample and the spectrum is shown in FIG. 10.

The resonance envelope was deconvoluted in four lines. Two Gaussian curves at −111 ppm and −115 ppm were necessary to fit the Si (1Al) signal. The curves for Si(1Al) and Si(2Al) have their maxima at −105 ppm, and −98 ppm, respectively. Based on the deconvolution, the $SiO_2/Al_2O_3$ molar ratio of the calcined sample corresponds to 16, which is in reasonable agreement with the chemical analysis. It can be concluded that the calcination does not lead to important dealumination. The definite presence of a signal at −98 ppm due to Si(2Al) is a particular property of this material.

Further experiments were carried out to vary parameters in the synthesis of the zeolite. The results are set out in the following table:

| | SYNTHESIS CHARACTERISTICS MOLAR COMPOSITION | | | | | | | CRYST. COND. | | PRODUCT CHARACTERISTICS | | | | | |
|---|---|---|---|---|---|---|---|---|---|---|---|---|---|---|---|
| | | | | | K/Al | OH/ $SiO_2$ | Si/ $Al_2$ | | | XRD | | SEM Particle | | | ELEMENTAL Si/$Al_2$ |
| | moles/10 moles $SiO_2$ | | | | at | molar | | temp | time | | Conta- | Length | Diameter | l/d | Ratio |
| EXAMPLE | $K_2O$ | R | $Al_2O_3$ | $H_2O$ | ratio | ratio | ratio | °C. | hrs | Product | minants | microns | | ratio | (calc) |
| 9 | 1.27 | 3.07 | 0.33 | 403 | 3.85 | 0.06 | 30.3 | 160 | 152 | ZSM-5 | none | 0.9 | 0.13 | ~6.5 | 28 |
| 10 | 2.91 | 3.02 | 0.50 | 409 | 5.82 | 0.28 | 20.0 | 160 | 142 | ZSM-5 | traces amorph | 2.1 | 0.8 | ~2.6 | 16 |
| 11 | 2.55 | 3.02 | 0.50 | 403 | 5.10 | 0.21 | 20.0 | 160 | 210 | ZSM-5 | none | 2.5 | ~0.6 | ~4.1 | 17.5 |
| 12 | 2.25 | 3.02 | 0.50 | 403 | 4.50 | 0.15 | 20.0 | 160 | 210 | ZSM-5 | none | 2.5 | ~0.45 | ~5.5 | 18.1 |
| 13 | 2.93 | 3.04 | 0.67 | 415 | 4.37 | 0.18 | 15.0 | 160 | 260 | ZSM-5 | traces amorph | 2.6 | ~0.4 | ~6.5 | 13.7 |
| | 1.27 | 3.02 | 0.67 | 412 | 1.90 | NIL | 15.0 | 160 | 246 | completely amorphous | | | | | |
| | 1.27 | 3.02 | 0.40 | 406 | 3.18 | 0.01 | 25.0 | 160 | 246 | completely amorphous | | | | | |
| 14 | 2.91 | 3.02 | 0.40 | 407 | 7.28 | 0.34 | 25.0 | 160 | 150 | ZSM-5 | unknown | | | | |
| 15 | 1.27 | 3.02 | 0.108 | 402 | 11.76 | 0.19 | 92.6 | 160 | 130 | ZSM-5 | none | 1.1 | ~0.50 | ~2.3 | 76 |
| 16 | 1.27 | 3.02 | 0.167 | 402 | 7.61 | 0.15 | 60.0 | 160 | 132 | ZSM-5 | none | 1.7 | ~0.52 | ~3.2 | 53 |
| 17 | 1.27 | 3.02 | 0.25 | 403 | 5.08 | 0.10 | 40.0 | 160 | 132 | ZSM-5 | none | 2.6 | ~0.40 | ~6.5 | 38 |
| 18 | 1.27 | 3.02 | 0.277 | 404 | 4.59 | 0.09 | 36.1 | 160 | 130 | ZSM-5 | none | ~2.65 | ~0.40 | ~6.6 | 34 |
| 19 | 1.08 | 3.02 | 0.108 | 402 | 10.0 | 0.15 | 92.6 | 160 | 160 | ZSM-5 | none | 1.4 | ~0.50 | ~2.8 | 81 |
| 20 | 0.84 | 3.02 | 0.108 | 402 | 7.78 | 0.10 | 92.6 | 160 | 160 | ZSM-5 | none | 1.7 | ~0.50 | ~3.4 | 84 |
| 21 | 0.58 | 3.02 | 0.108 | 402 | 5.37 | 0.05 | 92.6 | 160 | 194 | ZSM-5 | none | 2.2 | ~0.45 | ~4.9 | 89 |
| 22 | 0.70 | 3.03 | 0.108 | 403 | 6.48 | 0.075 | 92.6 | 160 | 194 | ZSM-5 | none | 2.1 | ~0.5 | ~4.0 | 87 |

Example 23

Crystallisation of a needle shaped Gallium containing ZSM-5 was achieved from a synthesis mixture containing

| A. Ludox AS-40 | 59.69 |
|---|---|
| $H_2O$ | 175.26 |
| B. $Ga_2O_3$ (Ingal) | 1.24 |
| KOH (87.5%) | 2.88 |
| $H_2O$ | 10.00 |
| Rinse $H_2O$ | 66.67 |
| C. 1.6. diamino hexane | 13.96 |
| D. Seeds AT281-112 | 0.3295 |
| 10.46 wt % solids in $H_2O$ | |
| | 329.98 |

The Ga source was dissolved in the KOH solution by boiling until clear, cooled to room temperature and the weight loss corrected with water. The Gallate solution was added to the Ludox/water mixture over 3 minutes. C was added and mixed with the mixture of A/B. The seeds D were added to the water/Ludox mixture before adding B. The whole mixture was rinsed for 5 minutes. The composition of synthesis mixture was:

0.57 $K_2O$/3.03 R/0.167 $Ga_2O_3$/10 $SiO_2$/403 $H_2O$, 105 wt ppm seeds. Si/$Ga_2$=59.9 $OH^-/SiO2$=0.119

Crystallisation:

Crystallisation was achieved by passing 288.01 gr of the synthesis mix to a 300 ml SS autoclave, placed the autoclave in a room temperature oven, heating up the oven for 2 hours to 160° C. and keeping the oven at this temperature for 152 hours.

Washing and Recovery:

Recovery of product. The product was washed to purity (3 x 800 ml of water), conductivity last wash water 18 µs. The product was then dried overnight at 105 ° C. Weight of product obtained 22.3 gr. Product yield 7.7 wt %.

Characterisation:

XRD, scanning electron micrograph.

Figure 11A:
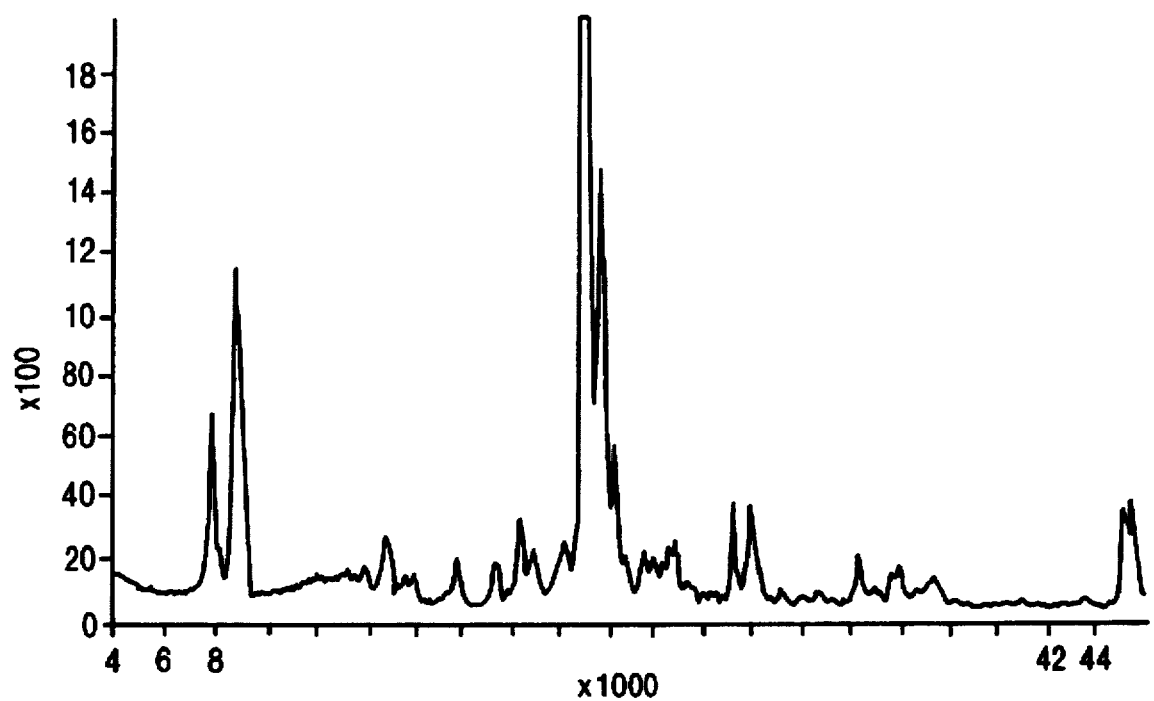
FIG. 11 comprises a x-ray diffractogram and SEM microphotographs of the product of Example 23.
Figure 11B:
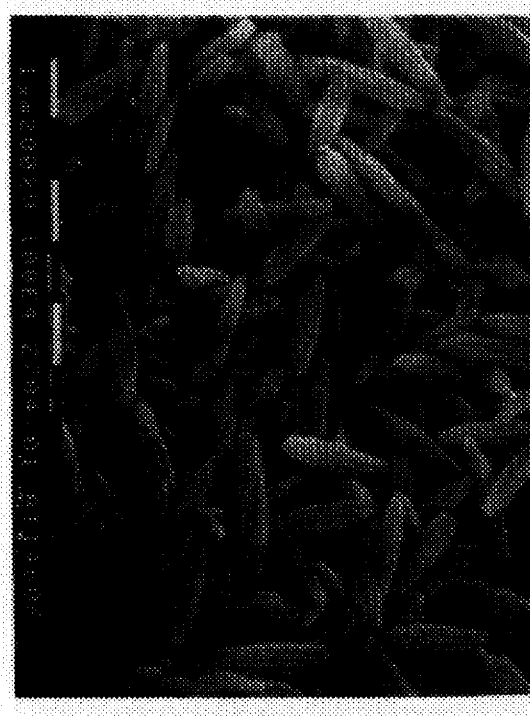
Figure 11C:
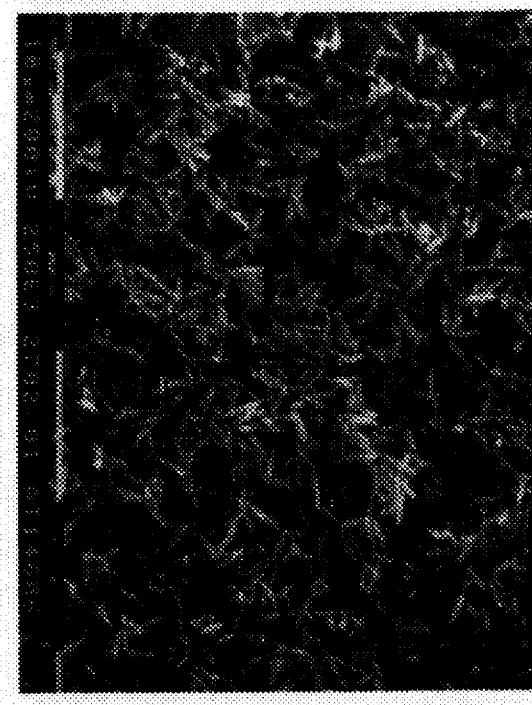

The X-ray diffraction pattern of the product and photographs of the crystals are shown in FIG. 11.

We claim:

1. A crystalline tectosilicate ZSM-5 zeolite comprising substantially needle-shaped agglomerates having an average length of 0.2 to 10 µm, said agglomerates having tapered ends such that the length of that portion of each agglomerate having a diameter less than the maximum diameter is at least 50 % of the total length of the agglomerate, said agglomerates composed of a plurality of smaller crystals agglomerated together, said smaller crystals having an average size of up to about 1 µm.

2. The zeolite of claim 1 wherein said zeolite is an aluminosilicate zeolite.

3. The zeolite of claim 1 wherein the average length/diameter ratio of the needle-shaped agglomerates is at least 2.5.

4. The zeolite of claim 3 wherein the average length/diameter ratio is at least 3.

5. The zeolite of claim 1 characterised in that the $^{29}$Si NMR spectrum has at least 3 peaks corresponding to Si having 0, 1 or 2 T-atoms respectively as nearest neighbours.

6. The zeolite of claim 5 wherein said zeolite is an aluminosilicate zeolite and said $^{29}$Si NMR spectrum has a peak at less than –105 ppm.

7. The zeolite of claim 6 wherein said $^{29}$Si NMR spectrum has a peak in the region from –85 to less than –105 ppm.

8. The zeolite of claim 5 wherein the zeolite crystals comprise aluminosilicate.

9. The zeolite of claim 2 wherein the $SiO_2/Al_2O_3$ molar ratio is 5 to 500.

10. A process for preparing a crystalline tectosilicate ZSM-5 zeolite comprising substantially needle-shaped agglomerates as described in claim 1, comprising crystallising a synthesis mixture containing:

(i) a source of silica;

(ii) a source of aluminium, gallium, boron, iron, zinc or copper, denoted as M, (iii) a source of a Potassium; and (iv) an organic structure directing agent; and, (v) if the synthesis mixture is agitated during crystallisation and the molar ratio of Si to M, is 20 or more, the synthesis mixture further comprises from 0.05 to 2000 ppm of seed crystals of an MFI-zeolite having an average largest dimension of not more than 100 nm.

11. The process of claim 10 wherein the molar ratio of Si to M is more than 20, the synthesis mixture is agitated and the synthesis mixture further comprises said seed crystals.

12. The process of claim 10 wherein the synthesis mixture initially contains OH ions at an OH–/$SiO_2$ molar ratio of from 0.025 to 0.34.

13. The process of claim 10 wherein the synthesis mixture initially has a molar ratio of Si to $M_2$ of from 15 to 100.

14. The process of claim 10 wherein the synthesis mixture initially contains OH ions at an OH–/$SiO_2$ molar ratio of 0.21 or less, and a molar ratio of Si to $M_2$ of less than 25.

15. The process of claim 10 wherein the organic structure directing agent is 1,6 -diaminohexane.

16. The zeolite of claim 1 wherein said agglomerates have an average length of 0.2 to 10 µm and said smaller crystals have an average size of 0.05 to 0.5 µm.

17. The zeolite of claim 16 wherein said agglomerates have an average length of 0.4 to 5 µm.

18. The zeolite of claim 1 wherein the length of that portion of each agglomerate having a diameter less than the maximum diameter is at least 60% of the total length of the agglomerate.

19. The zeolite of claim 18 wherein the length of that portion of each agglomerate having a diameter less than the maximum diameter is at least 70% of the total length of the agglomerate.

* * * * *